United States Patent [19]

Geronimi

[11] Patent Number: 5,471,045
[45] Date of Patent: Nov. 28, 1995

[54] SMART CARD LOCKING PROCESS

[75] Inventor: François Geronimi, Aix en Provence, France

[73] Assignee: Gemplus Card International, Gemenos, France

[21] Appl. No.: 140,114

[22] PCT Filed: May 5, 1992

[86] PCT No.: PCT/FR92/00407

§ 371 Date: Mar. 28, 1994

§ 102(e) Date: Mar. 28, 1994

[87] PCT Pub. No.: WO92/20042

PCT Pub. Date: Nov. 12, 1992

[30] Foreign Application Priority Data

May 6, 1991 [FR] France .................. 91 05514

[51] Int. Cl.$^6$ ............................. G06K 5/00
[52] U.S. Cl. ............................. 235/492; 380/4
[58] Field of Search ............................. 235/492; 380/4

[56] References Cited

U.S. PATENT DOCUMENTS

| | | | |
|---|---|---|---|
| 4,734,568 | 3/1988 | Watanabe | 235/380 |
| 4,777,355 | 10/1988 | Takahira | 235/492 |
| 4,810,862 | 3/1989 | Nakano et al. | 235/492 |
| 4,910,393 | 3/1990 | Gercekci et al. | 235/380 |
| 4,988,855 | 1/1991 | Iijima | 235/492 |
| 5,159,183 | 10/1992 | Yamaguchi | 235/492 |

FOREIGN PATENT DOCUMENTS

| | | | |
|---|---|---|---|
| 325506 | 7/1989 | European Pat. Off. | 380/4 |
| 4-52890 | 2/1992 | Japan | 235/492 |
| 4-180188 | 6/1992 | Japan | 235/492 |

*Primary Examiner*—John Shepperd
*Attorney, Agent, or Firm*—Nilles & Nilles

[57] ABSTRACT

A method of locking a smart card to block the operation of at least one protected program stored in a read-only memory or ROM of the smart card, the smart card incorporating a central processor, the ROM, an erasable programmable read-only memory or EPROM and a random access memory or RAM, the method including the steps of: entering a logic lock in the EPROM, making multiple copies of the logic lock in the EPROM, carrying out a logic OR on the logic lock in the EPROM and the multiple copies of the logic lock in the EPROM in order to block the performance of the protected program upon the detection of either (a) the logic lock in the EPROM or (b) at least one of the multiple copies of the logic lock in the EPROM, recopying the logic lock in the RAM, and performing the logic OR on the logic lock in the EPROM, the multiple copies of the logic lock in the EPROM, and the logic lock in the RAM.

5 Claims, 2 Drawing Sheets

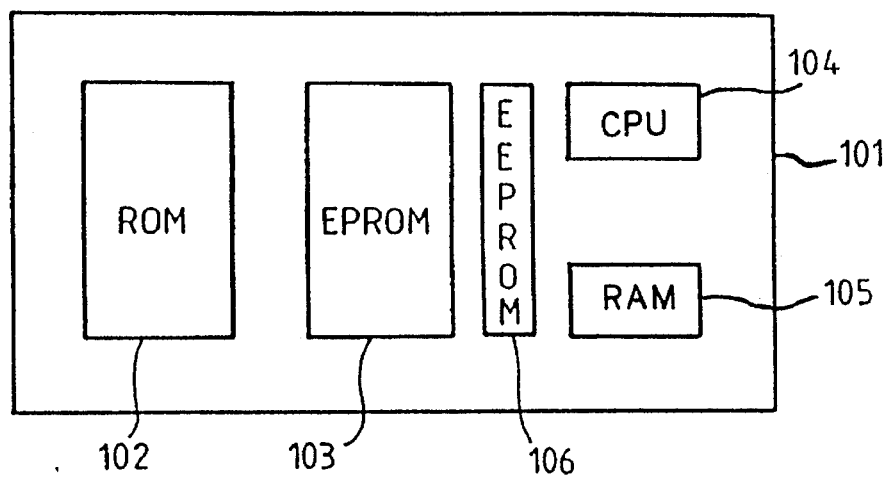
FIG_1
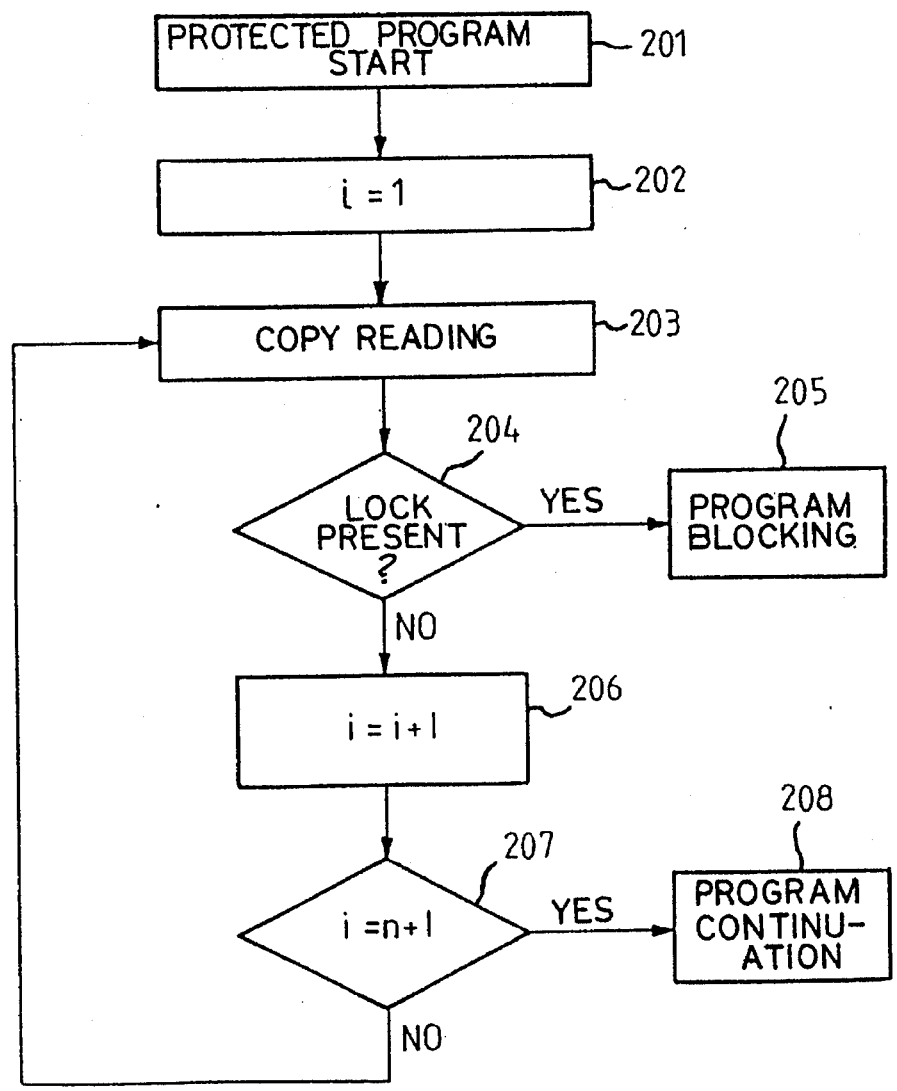
FIG_2

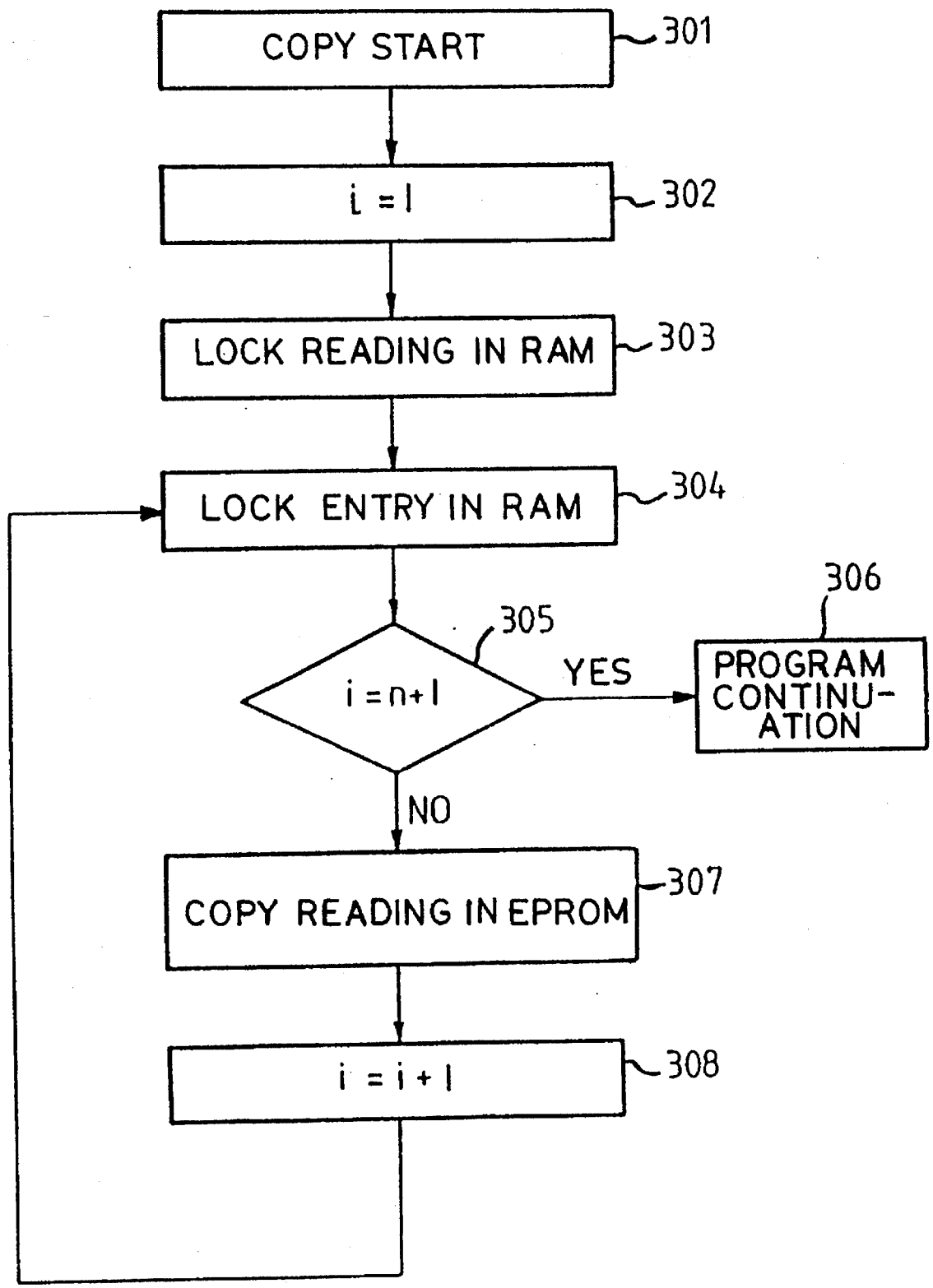

SMART CARD LOCKING PROCESS

BACKGROUND OF THE INVENTION

1. Field of the Invention

The present invention relates to processes making it possible to lock smart or chip cards, essentially for the purpose of preventing fraudulent use thereof.

2. Description of the Prior Art

Smart or chip cards are very frequently used in applications, e.g. banking, requiring a high level of security against fraudulent use. Fraudulent use can not only take place by a thief, but also by the owner of the card. Thus, in different stages, such as the production of the chip, transportation, personalization, etc. which precede the delivery of the card to the customer, gradually the field of action of a component (the chip) is limited, because at the outset it can lave numerous possible uses. If he were able to recommence the stages in upstream form, the card holder could use the card for purposes for which this is not authorized, e.g. for making multiple withdrawals from a bank, or exceeding the limit granted.

It is known to prevent such uses by locking each of the stages by logic locks, which make it impossible to recommence the operations corresponding to these stages. These locks are generally formed by a bit (or a word) written in the non-volatile memory (EPROM or EEPROM) of the circuit of the card at the end of the stage taking place. The program corresponding to this stage tests, prior to starting up, the presence of this bit and only starts if the latter has been recognized.

This solution is not completely satisfactory, because it can occur that such locks are accidentally moved aside or erased.

In addition, during the starting up of the system on energizing the card, there is necessarily an initialization phase making it possible for criminals to neutralize the volatile memory (RAM) and override the locking system.

Finally, it is not possible to completely test the component of the card at the end of its manufacture, because this would involve activating the locks and would make it impossible to return backwards in order to supply the card manufacturer with non-personalized components. It is therefore necessary to test the component and then the card at each stage between the manufacture of the component by successively setting the locks.

SUMMARY OF THE INVENTION

In order to obviate these disadvantages, the invention proposes a process for locking a smart card incorporating a central processor, a read-only memory or ROM, an erasable programmable read-only memory or EPROM and a random access memory or RAM, in which the operation of at least one protected runnable program stored in the ROM is blocked with a logic lock entered in the EPROM, wherein there is multiple copying of the logic lock in the EPROM and a logic OR is carried out on the complete original lock and its copies in order to block the performance of the protected program on the detection of at least one copy (original included) of the lock.

BRIEF DESCRIPTION OF THE DRAWINGS

The invention is described in greater detail hereinafter relative to a non-limitative embodiment and with reference to the attached drawings, wherein show:

FIG. 1 the diagram of a component for a smart card.
FIG. 2 a control flow chart for a lock.
FIG. 3 a copy flow chart for a lock.

DETAILED DESCRIPTION OF THE INVENTION

The smart card component 101 shown in FIG. 1 is an integrated circuit having in the present embodiment a read-only memory or (ROM) 102, an erasable programmable read-only memory or (EPROM) 103, a central processor or (CPU) 104 and a random access memory or (RAM) 105. It can incorporate an electrically erasable programmable read-only memory or (EEPROM) 106. This device is known and the connections between these different parts are not shown. The CPU (104) is a member of the microprocessor type using a runnable program fixed at the time of the manufacture of the component in the ROM 101, as well as data entered in the EPROM 103 during the different stages, e.g. personalization, which follow the manufacture of the component and extend up to the delivery of the card to the customer. The RAM 105 enables the CPU to enter and use temporary data during its operation. It is erased when the card is no longer energized.

In the prior art, a lock is entered in the EPROM 103 during each important stage of card manufacture. When there is an EEPROM, the locks are not stored in said memory, because there is a risk of the locks being erased by the central processor. For example, when the personalization of the card is ended a lock is entered and this makes it impossible to recommence the personalization. Personalization is an operation consisting of entering into the EPROM user-specific data and this entry is carried out by the CPU with the aid of a program in the ROM, under the control of instructions from the outside. The program contains instructions making it possible to check whether the lock is present in the EPROM and to prevent entry into the EPROM in this case. This is generally prevented by blocking the different elements of the program which permit personalization.

According to the invention in the EPROM are stored several copies of locks and during the running of one of the programs protected by one of these locks, a check is made on the original and copies of the lock corresponding to this program. If at least one of the thus checked locks is recognized, the running of the protected program is interrupted. Therefore this consists of making a logic OR on the presence of the locks in order to prevent the running of the program. Expressed differently, there is a logic AND on the absence of locks in order to authorize the running of the program. This presentational dualism is standard practice in data processing and e.g. corresponds to what is induced by the definition of high and low levels. In the remainder of the present text, the first presentation will be used, where a logic OR is formed in order to prevent the running of the program. In addition, there will only be a description of the operations relating to a single lock protecting a single program. The extension to several separate locks is obvious.

The copies of locks are preferably stored at separate locations distributed over the entire EPROM, so as to obviate the effect of a local chip fault and make it more difficult for any criminal to be successful.

This logic OR can e.g. take place in accordance with the flow chart of FIG. 2. Following the start in a stage 201 of the protected program, a standard index i is placed at 1 (202). This is followed by the reading in stage 203 of the original of the lock to be checked, which is followed by a test 204 with respect to its existence (value of the bit allocated to this lock). If the latter is present, the program is blocked (205). If it is absent, the index i is incremented (206) by 1. A test is then performed 207 on the value of i. If i is equal to or below n+1, in which n is the number of copies (original included) of the lock to be checked, there is a resumption with stage 203, which makes it possible to read the following copy of the lock. When i is equal to n+1, this means that the presence of the lock and all its copies has been tested and that none of them lave been found. This is followed by the continuation (208) of the running of the program, which has been authorized by said absence.

This flow chart consequently provides a logic OR, because the presence of a single copy of the lock blocks the running of the program. The reading of following copies is clearly pointless.

In order to prevent fraud during the initialization sequence on energizing the card, the invention also proposes the entering of the lock in the RAM, by recopying it from copies in the EPROM. The protected program blocking test then takes place by a logic OR on copies in the EPROM and on the copy or possibly copies in the RAM.

In addition, during the performance of all the runnable programs, every so often there is an updating program for the copy in the RAM, so as to be sure that the lock is still in the RAM. This updating program can be regularly started by a counter, or in random manner by a per se known random event generating program.

This copy can e.g. take place in accordance with a flow chart shown in FIG. 3. After starting the copy in stage 301, a standard index i is positioned at 1 (302). This is followed by the reading (303) of the lock which has been copied into the RAM and the latter is reentered (304) at the same location. The value of the index i is then tested (305) and if said index is not equal to n+1, there is a passage to a stage 307, where the copy i (original included) of the lock is read in the EPROM. Following said reading, i is incremented (308) by 1 and the lock is entered in the RAM at the same location as previously, thus returning to stage 304. When i=n+1, all the copies of the EPROM have been read and there is then a passage from test stage 305 to the remainder of the program (306), which has been interrupted for starting the updating program of the copy of the lock in the RAM.

If appropriate, said program can include a supplementary test stage relating to the output at 306 as soon as the presence of the lock in the RAM has been recognized, i.e. as soon as it has been read for the first time in stage 303 in the normal case where the lock has not been erased. There is still a logic OR and the operations are faster.

Therefore there are permanently available copies of the lock in the EPROM and the copy in the RAM. Thus, during the starting up by the user of each operation, corresponding to a program, it is possible to test the presence not only of copies in the EPROM, but also of that in the RAM and therefore prevent such a starting operation on establishing said presence. It is then impossible for a criminal to run programs to which he does not have access by manipulating, e.g. during initialization, the content of the RAM.

Obviously, this test of the presence of copies of the lock can take place during the performance of the programs in a regular or irregular manner. It is also possible to copy the lock at several different locations in the RAM.

Finally, during the chip testing sequences and even during subsequent sequences throughout the manufacture of the smart card, the invention proposes using a "false" lock entered only in the RAM. For this purpose the test program making it possible to check the operation of the chip by e.g. simulating the running of normal programs, does not enter the locks and their copies in the EPROM and only uses a "false" copy entered in the RAM. Thus, it is verified that the presence of this copy in the RAM blocks the forbidden programs, said verification being essential, but when the chip supply is interrupted, the RAM content is erased and the false lock disappears. It is also possible to enter a false lock in the EEPROM, in order to more completely test the component, knowing that it is possible to erase it subsequently by an adequate control.

Thus, a new chip is available, which can be supplied to the manufacturer having to perform the following stage of manufacture. Optionally the chip manufacturer enters in it a first lock, which blocks the program which he intends to reserve for himself. This operation can be repeated during each stage of card manufacture and thus each manufacturer can test the operation of the card downstream, but not upstream. In this way it is possible to detect at an early stage any abnormality which would only become apparent in a subsequent stage and therefore the product can be rejected during manufacture, which cuts down the costs of subsequent manufacture, which would only lead to an unusable product.

What is claimed is:

1. A method of locking a smart card to block the operation of at least one protected program stored in a read-only memory or ROM of the smart card, the smart card incorporating a central processor, the ROM, an erasable programmable read-only memory or EPROM and a random access memory or RAM, the method comprising the steps of: entering a logic lock in the EPROM, making multiple copies of the logic lock in the EPROM, carrying out a logic OR on the logic lock in the EPROM and the multiple copies of the logic lock in the EPROM in order to block the performance of the protected program upon the detection of either (a) the logic lock in the EPROM or (b) at least one of the multiple copies of the logic lock in the EPROM, recopying the logic lock in the RAM, and performing the logic OR on the logic lock in the EPROM, the multiple copies of the logic lock in the EPROM, and the logic lock in the RAM.

2. The method of claim 1, wherein the logic lock in the RAM is updated during the performance of the protected program.

3. The method of claim 2, wherein the updating is performed at random time intervals.

4. A method of locking a smart card to block the operation of at least one protected program stored in a read-only memory or ROM of the smart card, the smart card incorporating a central processor, the ROM, an erasable programmable read-only memory or EPROM and a random access memory or RAM, the method comprising the steps of: entering a logic lock in the EPROM, making multiple copies of the logic lock in the EPROM, carrying out a logic OR on the logic lock and the multiple copies in order to block the performance of the protected program upon the detection of one of (a) the logic lock and (b) at least one of the multiple copies, and, prior to entering the logic lock in the EPROM, entering a false lock in the RAM in order to instantaneously test the blocking of the protected program, said false lock and the corresponding blocking disappearing when the smart card is deenergized.

5. A method of locking a smart card to block the operation of at least one protected program stored in a read-only memory or ROM of the smart card, the smart card incorporating a central processor, the ROM, an erasable programmable read-only memory or EPROM, a random access memory or RAM, and an electrically erasable programmable read-only memory or EEPROM the method comprising the steps of: entering a logic lock in the EPROM, making multiple copies of the logic lock in the EPROM, carrying out a logic OR on the logic lock and the multiple copies in order to block the performance of the protected program upon the detection of one of the logic lock and at least one of the multiple copies, and, prior to entering the logic lock in the EPROM, entering a false lock in the EEPROM in order to instantaneously test the blocking of the projected program, then erasing the false lock and the corresponding blocking.

* * * * *